United States Patent
Anxionnaz et al.

(10) Patent No.: US 6,704,436 B1
(45) Date of Patent: Mar. 9, 2004

(54) METHOD OF OBTAINING A DEVELOPED TWO-DIMENSIONAL IMAGE OF THE WALL OF A BOREHOLE

(75) Inventors: Hervé A. Anxionnaz, Rue du Plateau (FR); Jean-Pierre R. Delhomme, Boulogne Billancourt (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/470,435

(22) Filed: Dec. 22, 1999

(30) Foreign Application Priority Data

Dec. 30, 1998 (FR) .............................. 98 16614

(51) Int. Cl.$^7$ ................................. G06K 9/00
(52) U.S. Cl. ................... 382/109; 348/85; 356/241.1; 33/302; 73/152.01
(58) Field of Search ................ 382/109, 284; 348/82, 85; 356/241.1; 33/302; 73/152.01; 250/253

(56) References Cited

U.S. PATENT DOCUMENTS

| | | | | |
|---|---|---|---|---|
| 5,243,521 A | * | 9/1993 | Luthi | 702/11 |
| 5,581,024 A | * | 12/1996 | Meyer et al. | 73/152.03 |
| 5,809,163 A | | 9/1998 | Delhomme et al. | |
| 5,812,068 A | * | 9/1998 | Wisler et al. | 340/855.5 |
| 5,862,513 A | * | 1/1999 | Mezzatesta et al. | 702/9 |
| 6,125,203 A | * | 9/2000 | Keskes et al. | 382/171 |
| 6,191,586 B1 | * | 2/2001 | Bittar | 324/339 |
| 6,233,524 B1 | * | 5/2001 | Harrell et al. | 702/9 |
| 6,247,542 B1 | * | 6/2001 | Kruspe et al. | 175/40 |
| 6,446,718 B1 | * | 9/2002 | Barrett et al. | 166/250.01 |

FOREIGN PATENT DOCUMENTS

| | | |
|---|---|---|
| EP | 0561492 A2 | 9/1993 |
| EP | 0718641 A2 | 6/1996 |
| WO | WO 97/26562 | 7/1997 |

* cited by examiner

*Primary Examiner*—Amelia M. Au
*Assistant Examiner*—Arnold Bhatnagar
(74) *Attorney, Agent, or Firm*—Martin Hyden; Helene Rayboud

(57) ABSTRACT

The invention relates to a method of obtaining a developed two-dimensional image of the wall of a borehole. The method comprises the steps consisting in:

- measuring a primary physical magnitude in said borehole as a function both of depth and of azimuth;
- measuring a secondary physical magnitude in said borehole as a function of depth;
- establishing a relationship ($f$) between said primary physical magnitude and said secondary physical magnitude; and
- deducing from said relationship values for said secondary physical magnitude as a function both of depth and of azimuth, which method makes it possible to reconstruct a two-dimensional image developed over the wall of a borehole concerning a secondary physical magnitude which is measured in said borehole as a function of depth only. The invention is particularly applicable to density imaging.

13 Claims, 3 Drawing Sheets

(2 of 3 Drawing Sheet(s) Filed in Color)

METHOD OF OBTAINING A DEVELOPED TWO-DIMENSIONAL IMAGE OF THE WALL OF A BOREHOLE

The present invention relates to a method of obtaining a developed two-dimensional image of the wall of a borehole.

BACKGROUND OF THE INVENTION

It is already known to obtain two-dimensional images of certain physical magnitudes referred to below as "primary" magnitudes as developed over the wall of a borehole on the basis of measurements of such a magnitude that are obtained at each depth from within the borehole and for each azimuth direction. It is thus possible to reconstruct a developed image of said physical magnitude by causing each pixel of a plane defined by depth and azimuth coordinates to have a color (or a gray level) that is a function of the value of the physical magnitude measured at that point.

By way of example, two-dimensional images have already been made of the electrical conductivity of the ground surrounding the borehole, and more particularly of its resistivity in the immediate proximity of the borehole wall (FMI imaging). Other physical magnitudes can be envisaged, insofar as it is possible to measure them at a given depth and over a plurality of azimuths, as is the case for example of acoustic impedance measured by means of an ultrasound imaging device (UBI).

Nevertheless, until now it has not been possible to obtain such two-dimensional images for certain physical magnitudes when it is not possible at a given depth to measure that magnitude in only a single azimuth direction (possibly integrated over an azimuth window of varying size depending on the type of measurement). For that kind of physical magnitude, all that is obtained is a curve, known as a "log", showing how the magnitude varies as a function of depth in an azimuth direction that may be fixed or otherwise.

As an example of such a "secondary" physical magnitude, mention can be made of density or of photoelectric factor as measured by means of a high resolution measurement device. The same applies to permeability obtained from a nuclear magnetic resonance measurement device, or to dielectric constant or to wave attenuation recorded by means of an electromagnetic propagation measuring tool. All such measurement devices are mounted on a tool having pads pressed against the wall of the borehole in a given direction and thus providing, at each depth, a value of the physical magnitude in question as measured in said direction.

These measurements therefore suffer inherently from a lack of coverage as a function of azimuth, and that constitutes a limitation in formations that are not uniform, e.g. of the nodular, lenticular, conglomerated, or fractured types.

BRIEF SUMMARY OF THE INVENTION

The present invention seeks to provide a method enabling a two-dimensional image of such a physical magnitude to be reconstructed from linear sampling of said magnitude as a function of depth in a borehole, i.e. from a log.

To this end, in a first aspect, the invention provides a method of obtaining a developed two-dimensiotnal image of the wall of a borehole, the method being characterized by the fact that it comprises the steps consisting in:

establishing a relationship between a primary physical magnitude measured in said borehole as a function both of depth and of azimuth, and a secondary physical magnitude measured as a function of depth; and deducing from said relationship, values for said secondary physical magnitude as a function both of depth and of azimuth.

Thus, by using the values of the secondary physical magnitude as deduced as a function of azimuth, it is possible to reconstruct an image of said magnitude which, until now, has been known from a curve established as a function of depth only.

In a particular implementation, the method includes a stop consisting in matching the resolution of the primary physical magnitude to the resolution of the secondary physical magnitude.

Also in a particular implementation, the method of the invention includes a step consisting in matching the angle reference for the measurements of the primary physical magnitude with the angle reference for the measurements of the secondary physical magnitude.

Also in a particular implementation, the method of the invention includes a step consisting in matching the depth values at which the primary physical magnitude is sampled with the depth values at which the secondary physical magnitude is sampled.

The various above-mentioned matching steps seek essentially to correct certain measurement artifacts caused by variations in speed due to imperfect control of the movement of the sondes carrying the measurement instruments as they move in the borehole. This applies in particular to depth matching which is made necessary by the elasticity of the cables that support the sondes and by the friction between the sondes and the walls of the borehole. This also applies to matching angular references due to the fact that sonde azimuth varies during vertical displacement.

The purpose of matching measurement resolution is to ensure that measurements performed on different physical magnitudes and thus known with different resolutions are made comparable. For example, it is clear that resistivity is measured with depth resolution that is much higher than that of density.

In a particular implementation, said relationship is established between the values for the secondary physical magnitude and the values for the primary physical magnitude as measured on the azimuth direction in which the secondary physical magnitude is measured.

Advantageously, said relationship is established subject to values for at least one auxiliary physical magnitude.

In which case, said auxiliary physical magnitude is sampled as a function of depth and is integrated over at least one azimuth interval.

These auxiliary physical magnitudes as measured or as calculated at each depth step provide the context for local interpretation of the relationship between the primary and secondary physical magnitudes. It is assumed that they are appropriately matched in depth to both of said physical magnitudes.

As an example of such auxiliary physical magnitudes, account can be taken of indicators of porosity such as the results of gamma ray measurement or of neutron logging, or account can be taken of texture indicators such as statistics derived from analyzing borehole images.

More particularly, said relationship is established by means of an artificial neural network.

Naturally, that is but one particular computation technique which has been found to be advantageous in the cases under consideration, and other methods can be envisaged.

In a particular implementation, in order to deduce the values of said secondary physical magnitude from said relationship, said relationship is applied to the values of said primary physical magnitude sampled as a function of depth and of azimuth.

Also in a particular implementation, the measured values of the secondary physical magnitude are compared with the corresponding reconstructed values, and a criterion concerning the quality of the reconstruction model is deduced therefrom, in particular concerning the quality of the neural model.

This comparison can be performed by any appropriate method, e.g. by the least squares method. It is then possible to readjust the model to optimize the quality criterion.

In another aspect, the invention provides a method of obtaining a developed two-dimensional image of the wall of a borehole, characterized by the fact that it comprises the steps consisting in:

measuring a primary physical magnitude in said borehole as a function both of depth and of azimuth;

measuring a secondary physical magnitude in said borehole as a function of depth;

establishing a relationship between said primary physical magnitude and said secondary physical magnitude; and deducing from said relationship values for said secondary physical magnitude as a function both or depth and of azimuth.

BRIEF DESCRIPTION OF THE SEVERAL VIEWS OF THE DRAWINGS

The file of this patent contains at least one drawing executed in color. Copies of this patent with color drawings will be provided by tie Patent and Trademark Office upon request and payment of the necessary fee.

There follows a description of a particular implementation of the invention, given by way of non-limiting example and with reference to the accompanying diagrammatic drawings, in which.

DESCRIPTION OF THE INVENTION

Figure 1:
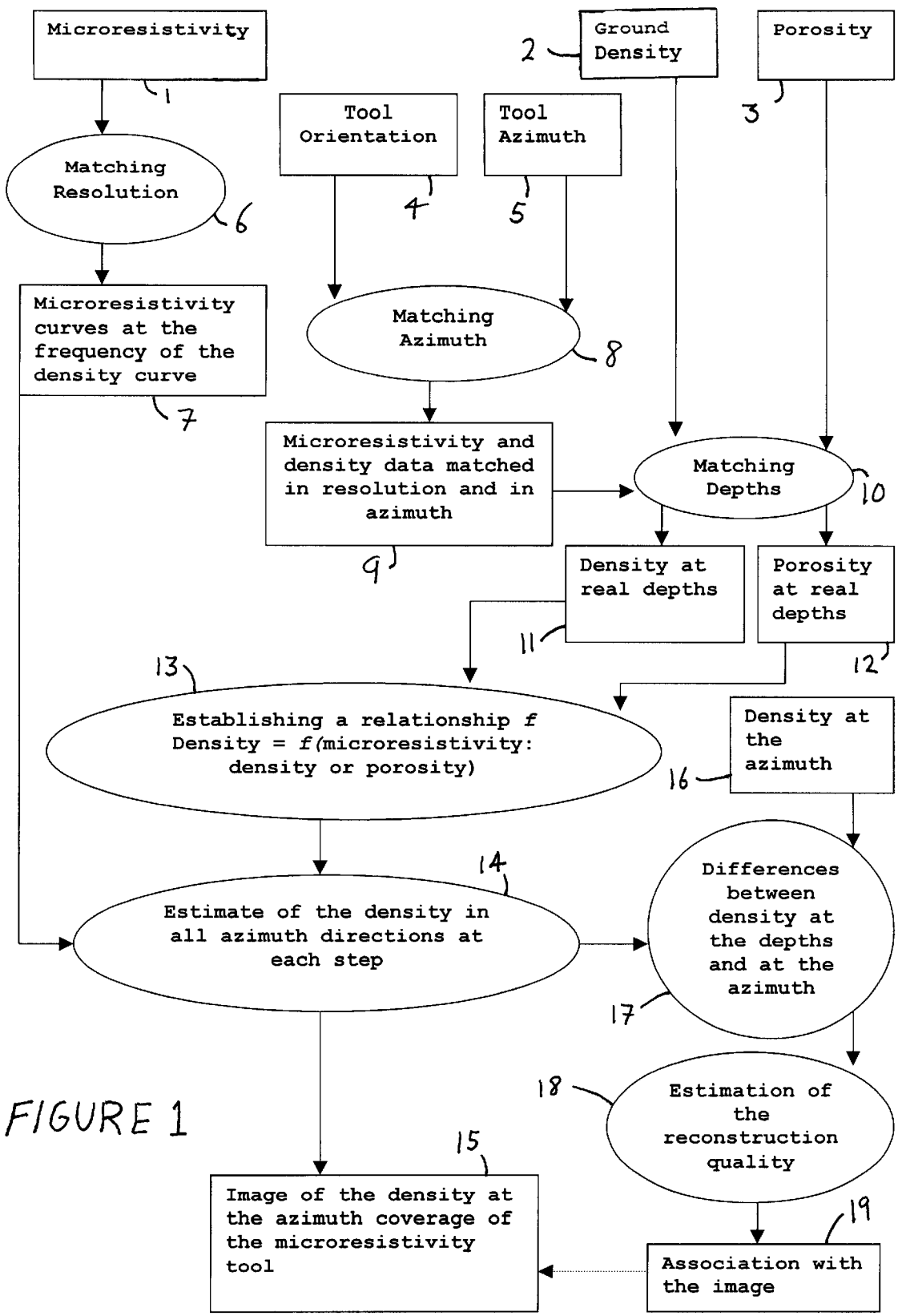
FIG. 1 is a general flow chart of the method of the invention.
Figure 2A:
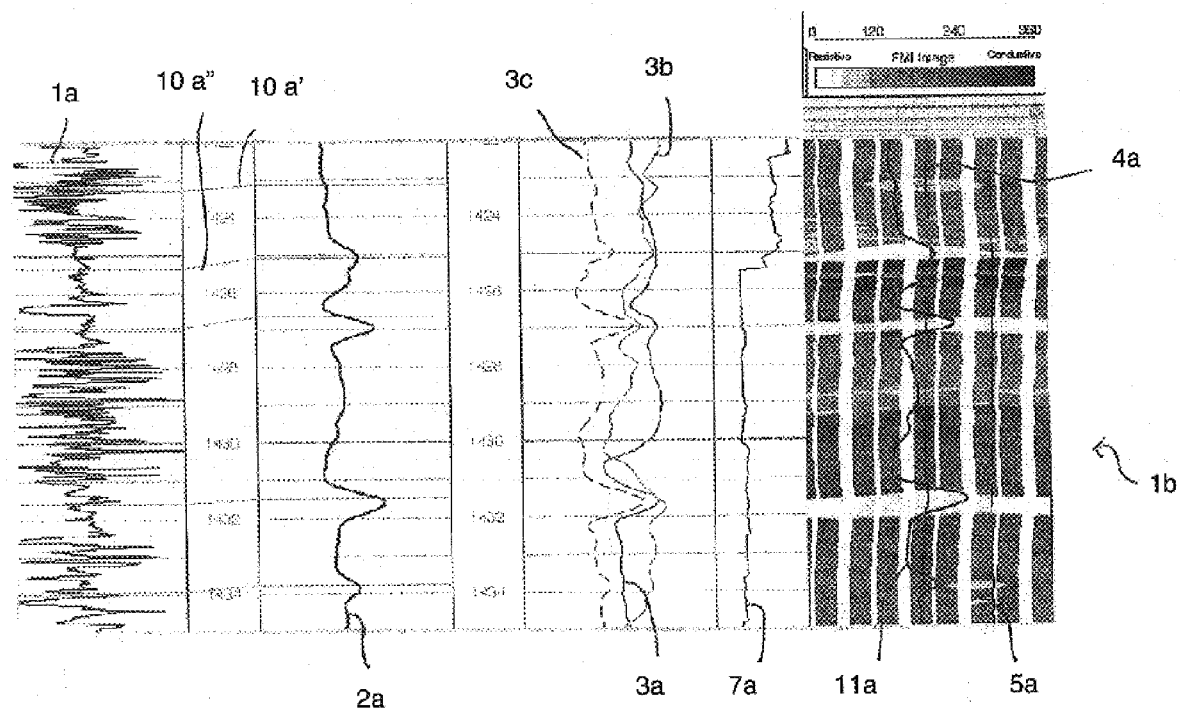
FIGS. 2A and 2B give curves illustrating the various steps of the method, together with the images obtained during some of the steps.
Figure 2B:
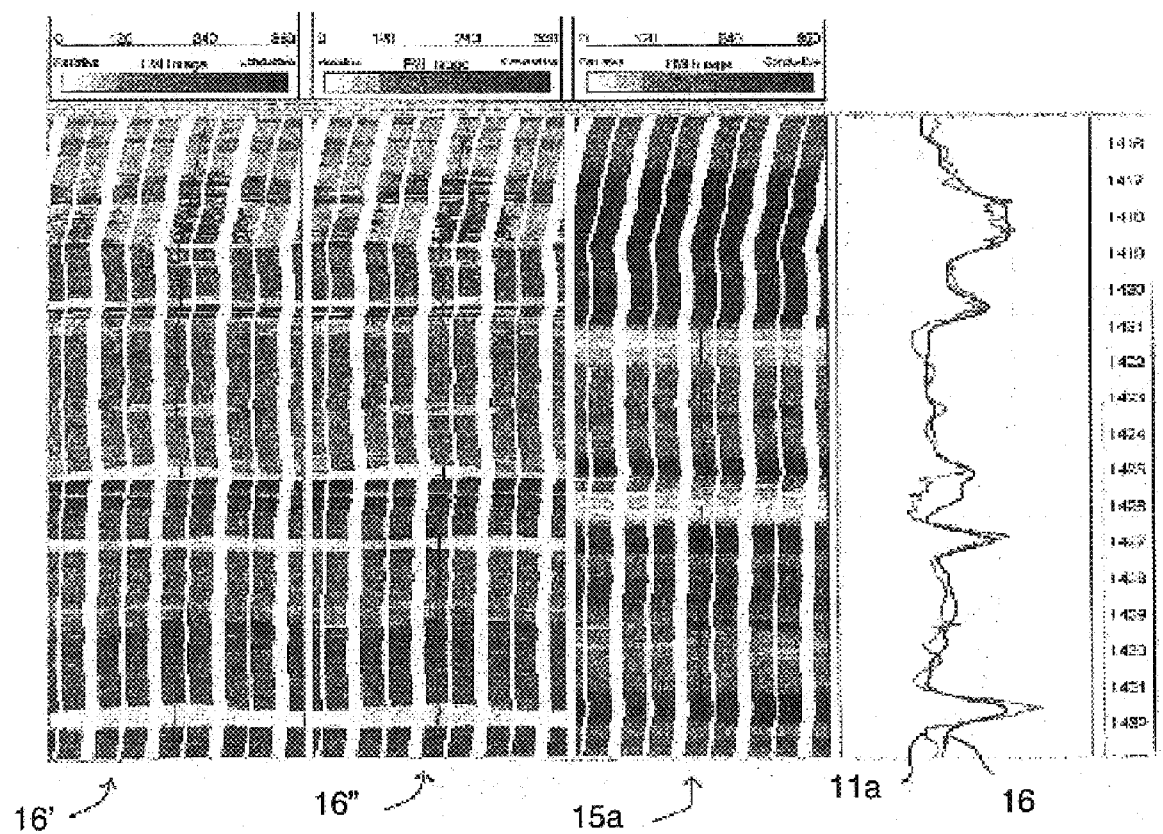

The curves and images in FIGS. 2A and 2B are given the same numerical references as the method steps in FIG. 1 during which they were obtained, with each numerical reference then being accompanied by a letter.

In FIG. 1, steps 1, 2, and 3 constitute steps of measuring the primary physical magnitude, the secondary physical magnitude, and auxiliary physical magnitudes In the present case, the primary physical magnitude measured in step 1 is microresistivity. It is typically obtained by means of a tool that measures this magnitude at each depth step, e.g. every 2 mm, by using 192 sensors operating on 192 different azimuth directions. Simultaneously, step 4 (FIG. 1) consists in measuring the orientation of the tool by means of a three-axis magnetometer which supplies the direction of the Earth's magnetic field, so as to have a reference azimuth direction serving to identify the direction in which each sensor performs its measurement. It is also possible to use a three-axis accelerometer in order to have a reference direction.

Curve la in FIG. 2A shows the variations in microresistivity as measured by one of the 192 sensors. If a color or a gray level is given to each microresistivity range, it is possible to obtain an image of this magnitude as developed on the wall of the borehole, by representing each measurement in a plane as a function of depth and of azimuth. One such image is given at 1b in FIG. 2A.

At 4a, this figure also shows the curve picked up at 4 and giving, for each depth, the azimuth of a reference sensor in the set of 192 sensors. This curve shows how the tool rotates as it moves in the depth direction, The white stripes in FIG. 2A parallel to curve 4a correspond to azimuth ranges in which there are no microresistivity sensors because of the way in which the tool is constructed and they are not associated with the present invention.

Step 2 consists in measuring a secondary physical magnitude as a function of depth and in a singe known direction. In this case it is ground density as obtained by a gamma ray log, and it is presented by curve 2a in FIG. 2A.

Tile azimuth of the tool is also measured at 5 (FIG. 1) as a function of depth. This azimuth is shown by curve 5a in FIG. 2A. It can be seen that it varies little, since this tool is kept oriented in relatively accurate manner by the pad which carries the sensor and which presses it against the wall of the borehole.

The object of the invention is to reconstruct the values of this secondary physical magnitude substantially over 360° around the taxis of the borehole.

The auxiliary magnitude measurements performed in step 3 relate to volume and are not directional. In this case, porosity is measured by sound logging, by gamma rays, and by neutron logging, thus giving curves 3a, 3b, and 3c respectively as a function of depth in FIG. 2A.

Once the necessary measurements have been taken during steps 1 to 3, the following steps consist in matching these measurements to make them mutually compatible.

Step 6 consists in matching the resolution of each of the microresistivity curves such as 1a with the resolution of the density curve 2a. This amounts to averaging the microresistivity values by computation so as to obtain the carriers of the curves 1a at the fundamental frequency of the curve 2a. Thus, in step 7 of FIG. 1, curves such as curve 7a in FIG. 2A are obtained, each matching one of the curves 1a, there being 192 such curves in this case.

In step 8 of FIG. 1, the azimuths of the microresistivity curves 7a are matched to the azimuth of density curve 2a, which amounts merely to putting the various measurements into an absolute angular frame of reference rather than referring them to the corresponding tool at the time of measurement. The azimuth curves 4a and 5a are used for this purpose. Thus, in step 9 of FIG. 1, two data sets are obtained, respectively concerning microresistivity and density, which data sets are matched both in resolution and in azimuth.

It is assumed that no azimuth matching is necessary for the auxiliary physical magnitudes since these measurements are believed, at any given depth in the borehole, to provide a value for the magnitude that is taken as being integrated over an azimuth range, and generally over 360°.

Step 10 consists in matching the depths of the data obtained during the various prior operations and that have different depth measurement errors. To this end, the measurements of the secondary and auxiliary magnitudes are matched to the measurements of the primary magnitude.

This matching is performed empirically by identifying, in curves 1a and 2a on the one hand, and in curves 1a and 3a–3c on the other hand, points that correspond such as 10a', 10a", . . . hereafter, the various secondary and auxiliary measurements are given absolute depths by computation so as to make it possible in steps 11 and 12 of FIG. 1 respectively to obtain the density curve 11*a* of FIG. 2A as a function of real depth, and equivalent curves (not shown) concerning the auxiliary magnitudes.

Thereafter, step 13 consists in establishing a relationship between the matched secondary magnitudes as obtained in 11 and firstly the primary magnitudes and secondly the auxiliary magnitudes as obtained in 12, the relationship being of the form:

density=$f$(microresistivity$_m$, auxiliary)

In which density is represented as a function of matched microdensity, subject to the values of the auxiliary magnitude(s), in this case porosity and natural radioactivity.

In the above equation, the variable microresistivity$_m$, should be understood as being the microresistivity of the wall on the density measurement azimuth, and assuming that all matching operations have already been performed.

Naturally, this does not mean that this variable takes account only of the log actually performed on said azimuth. In general, density measurement integrates the values of this magnitude over a sector that is larger than that of a single microresistivity measurement. Thus, account is advantageously taken of a plurality of logs made on either side of the azimuth of the density measurement, e.g. by weighted averaging of the various microresistivity measurements performed at given depth in the logs.

Step 13 can be implemented by processing the input data using a non-parametric multivariable regression technique. More particularly, it is possible to use an artificial neural network to which the input data constitutes a training set.

A two-layer network has been used with ten nodes per layer, together with two hidden levels. Tie inputs were constituted by:

microresistivity $\overline{R}$ measured in the density measurement direction, averaged and matched in azimuth and in depth;

the measured density $\rho_{dm}$; and the measured porosity $\phi_N$ obtained by the neutron log; and the output was constituted by estimated density $\rho$.

In practice, 1200 sets of measurements have been used. 600 of these sets of measurements enabled the function $f$ to be determined, and the other 600 served to validate it and correct the weights of the inputs.

As is common practice in geology (Walther's law), it is assumed that any accident (nodule, vacuole, . . . ) that is to be found at a given depth in an azimuth in which the secondary or physical magnitude has not been sampled, will nevertheless have been sampled at some other depth, providing the interval studied is long enough. This guarantees that the approach adopted is not open to doubt because of a non-representative training set.

It is also assumed that the auxiliary physical magnitudes carry sufficient information to take account of the portion of the spatial variability of the primary physical magnitude which is not directly associated with changes in the secondary physical magnitude. This ensures the exhaustiveness that is required at the input to the artificial neural network, for example.

It will be observed that even tinder such circumstances it is unlikely that a one-to-one relationship can be found, given the inherent variability of natural phenomena, and given uncontrolled effects such as hole effects.

The dispersion of the reconstructed values of the secondary physical magnitude relative to the dispersion of the original values is analyzed statistically over the training set so as to provide an indication of the uncertainty associated with the reconstruction process, and so as to verify that the inputs are exhaustive.

Once the relationship $f$ has been obtained in this way it is applied at 14 to the averaged values $\overline{R}$ of the resistivity for each of the 192 sensors, so as finally to obtain an estimate of the density $\rho$ in the 192 different azimuth directions at each depth step.

At 15, this gives an image of the secondary physical magnitude developed over the wall of the borehole, possessing the same resolution in depth and in azimuth as the measurements of the secondary physical magnitude, but having azimuth coverage that is the same as that of the primary physical magnitude.

The influence of the auxiliary physical magnitude used for determining the relationship between the primary and secondary physical magnitudes serves to ensure that the image of the secondary physical magnitude does not merely reproduce the image of the primary physical magnitude but at lower resolution.

FIG. 2B shows three images, which going from left to right comprise:

image 1*b*' of the primary magnitude in a range of depths that is slightly smaller than 1*b* in FIG. 2*a*;

image 1*b*" of the same primary magnitude, but using values that have been matched for resolution in step 6; and image 1*a* of the magnitude as obtained in step 15.

On the right-hand side of FIG. 2A there is also shown curve 11*a* corresponding to density as measured and adapted, together with curve 16*a* corresponding to density as calculated in step 16 of FIG. 1 at the same azimuth by using the relationship $f$.

Thereafter, in step 17, the differences between the curves 11*a* and 16 are analyzed, e.g. using the least squares method. In step 18, the result makes it possible to estimate the quality of the reconstruction, since, for given azimuth, the reconstructed values of the secondary magnitude have been compared with the values of said magnitude as measured.

Finally, in step 19, the above estimate is associated with the reconstructed image 15*a*. Iteration also makes it possible to optimize the reconstruction model by maximizing the criterion constituted by the above-specified estimate.

The method of the invention thus provides not only the desired image of the secondary magnitude, but also a criterion concerning the quality of said image and means for optimizing it.

What is claimed is:

1. A method of obtaining a primary physical magnitude measurement including resistivity and acoustic impedance and a secondary physical magnitude measurement including density, photoelectric factor, permeability, dielectric constant, and wave attenuation, comprising:

(i) obtaining a measurement of a primary physical magnitude measured in the borehole as a function of depth at a first resolution, and a measurement of a secondary physical magnitude that is different to the first physical magnitude and measured in the borehole as a function of depth only at a second resolution;

(ii) establishing a relationship ($f$) between the primary physical magnitude and the secondary physical magnitude at a matched resolution;

(iii) using the relationship to deduce values for the secondary physical magnitude as a function both of depth and of azimuth; and (iv) using the deduced values to obtain a developed, two-dimensional image of the secondary physical magnitude at the borehole wall.

2. A method as claimed in claim 1, wherein the relationship (f) matches the resolution of the primary physical magnitude to the resolution of the secondary physical magnitude.

3. A method as claimed in claim 1, further-comprising matching angle references for measurements of the primary physical magnitude with angle references for the measurements of the secondary physical magnitude.

4. A method as claimed in claim 1, further comprising matching depth values at which the primary physical magnitude is measured with depth values at which the secondary physical magnitude is measured.

5. A method as claimed in claim 1, wherein the relationship (f) is established between values for the secondary physical magnitude and values for the primary physical magnitude as measured on the same azimuth as that of the secondary physical magnitude.

6. A method as claimed in claim 1, comprising establishing the relationship subject to values for at least one auxiliary physical magnitude that is different to both the primary and secondary physical magnitudes.

7. A method as claimed in claim 6, wherein the auxiliary physical magnitude is sampled as a function of depth and is integrated over at least one azimuth interval.

8. A method as claimed in claim 1, further comprising establishing the relationship by means of an artificial neural network.

9. A method as claimed in claim 1, further comprising deducing values of the secondary physical magnitude from the relationship by applying the relationship values of the primary physical magnitude measured as a function of depth and of azimuth.

10. A method as claimed in claim 1, further comprising comparing measured values of the secondary physical magnitude with the corresponding reconstructed values, and deducing a criterion concerning the quality of the reconstruction model therefrom.

11. A method of obtaining a primary physical magnitude measurement including resistivity and acoustic impedance and a secondary physical magnitude measurement including density, photoelectric factor, permeability, dielectric constant, and wave attenuation, comprising:

(i) measuring a primary physical magnitude in the borehole as a function of depth at a first resolution;

(ii) measuring a secondary physical magnitude that is different to the first physical magnitude and measured in the borehole as a function of depth only at a second resolution;

(iii) establishing a relationship (f) between the primary physical magnitude and the secondary physical magnitude at a matched resolution;

(iii) using the relationship to deduce values for the secondary physical magnitude as a function both of depth and of azimuth; and (iv) obtaining a developed, two-dimensional image of the secondary physical magnitude at the borehole wall using the deduced values of the secondary physical magnitude.

12. A method as claimed in claim 11, further comprising measuring an auxiliary physical magnitude that is different to both the primary and secondary physical magnitudes.

13. A method as claimed in claim 12, further comprising measuring the auxiliary physical magnitude as a function of depth and integrating the measurement over at least one azimuth interval.

* * * * *